United States Patent
Bench

(10) Patent No.: US 7,449,661 B1
(45) Date of Patent: Nov. 11, 2008

(54) IN-PIPE HEAT TRACE SYSTEM

(76) Inventor: Steven D. Bench, 4137 S. 500 West, Murray, UT (US) 84123

( * ) Notice: Subject to any disclaimer, the term of this patent is extended or adjusted under 35 U.S.C. 154(b) by 124 days.

(21) Appl. No.: 11/593,204

(22) Filed: Nov. 3, 2006

(51) Int. Cl.
*H05B 1/02* (2006.01)

(52) U.S. Cl. .................. 219/201; 219/481; 219/541; 219/549; 219/553; 219/494; 338/210; 244/116; 244/137.2; 244/114 R; 392/472; 392/481; 392/485

(58) Field of Classification Search .......... 219/201, 219/535–538, 544–548, 497, 481, 553, 494; 392/451, 449, 478, 480, 481, 485, 489, 479, 392/483, 482, 472; 338/212, 298, 210; 244/114 R, 244/116, 137.2, 137.1
See application file for complete search history.

(56) References Cited

U.S. PATENT DOCUMENTS

| | | | |
|---|---|---|---|
| 1,760,057 A * | 5/1930 | Hawley | ............... 338/298 |
| 2,585,443 A * | 2/1952 | Cox | ............... 338/212 |
| 3,378,673 A | 4/1968 | Hopper | |
| 3,716,693 A | 2/1973 | Bleckmann | |
| 4,859,834 A * | 8/1989 | Hausler et al. | ............... 219/497 |
| 5,149,017 A * | 9/1992 | McEntire et al. | ......... 244/114 R |
| 5,408,579 A | 4/1995 | Hunt | |
| 5,497,824 A | 3/1996 | Rouf | |
| 5,552,576 A * | 9/1996 | Giamati | ............... 219/201 |
| 5,774,627 A | 6/1998 | Jackson | |
| 5,982,987 A * | 11/1999 | McDonald et al. | ......... 392/449 |
| 6,078,730 A | 6/2000 | Huddart et al. | |
| 6,516,142 B2 * | 2/2003 | Grant et al. | ............... 392/451 |
| 6,539,171 B2 | 3/2003 | VonArx et al. | |

* cited by examiner

*Primary Examiner*—Mark H Paschall
(74) *Attorney, Agent, or Firm*—Gordon K. Anderson

(57) ABSTRACT

A heat trace system (10) is used for heating water to prevent freezing in a conduit (20) while servicing an aircraft positioned at a passenger loading bridge (52). An upstream fitting (26) is attached onto the conduit adjacent to a building structure and a downstream fitting (48) is attached onto the conduit adjacent to the cab of the passenger loading bridge. A coated retractable coiled wire disposed within the conduit and cold lead wires (46) enter through the upstream fitting and leave through the downstream fitting. A low voltage solid state power control box (56) is in communication with the cold lead attached to the coiled wire inside providing regulated electrical energy for heating the coiled wire thus preventing freezing the water within in the conduit.

15 Claims, 5 Drawing Sheets

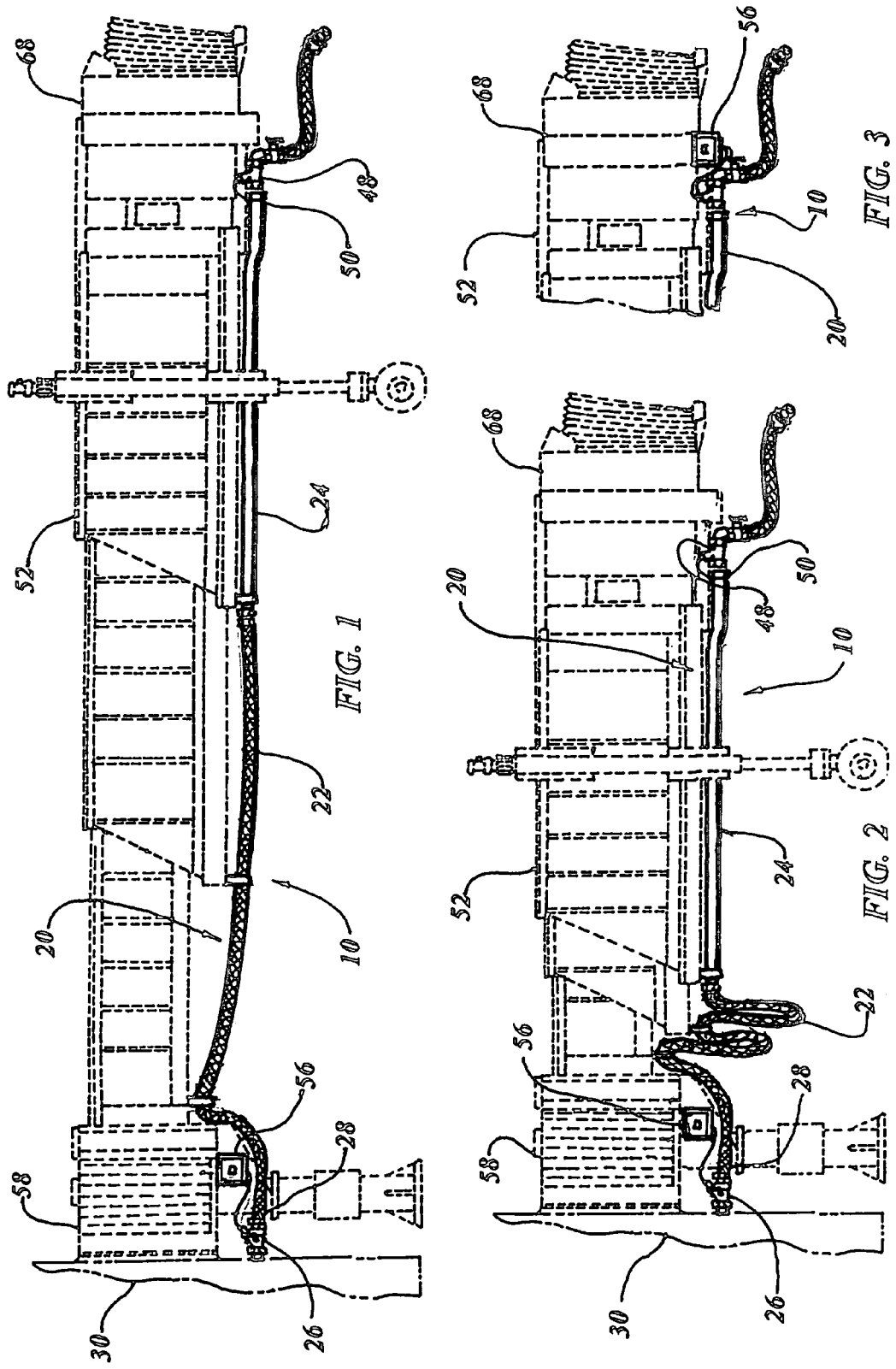

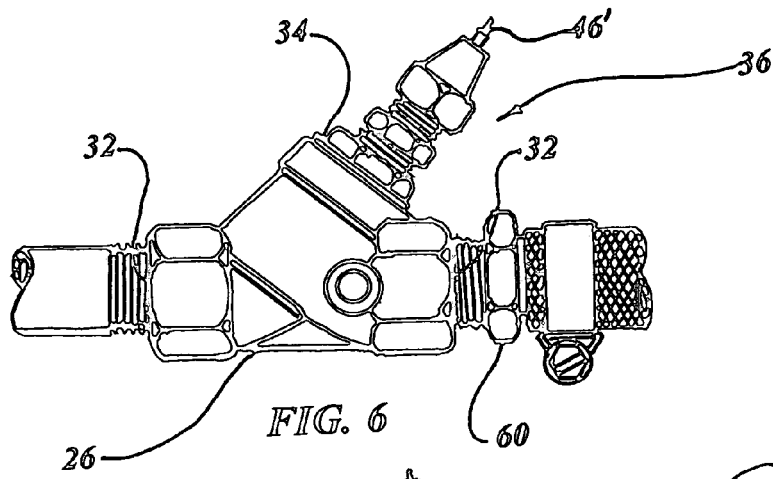
FIG. 6
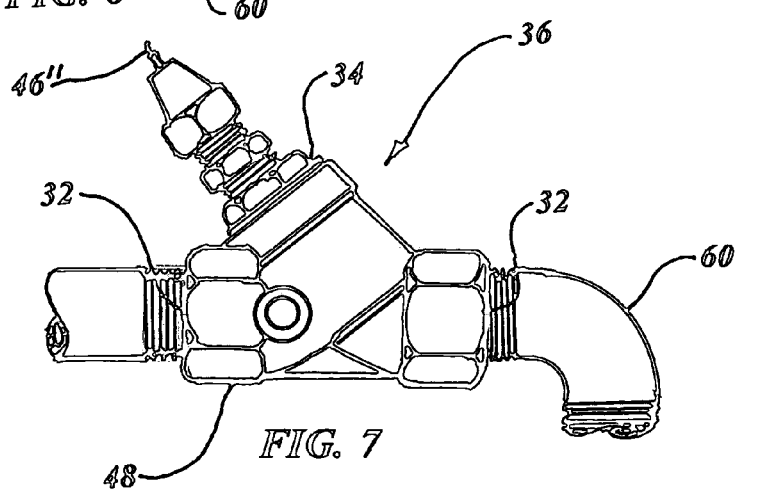
FIG. 7
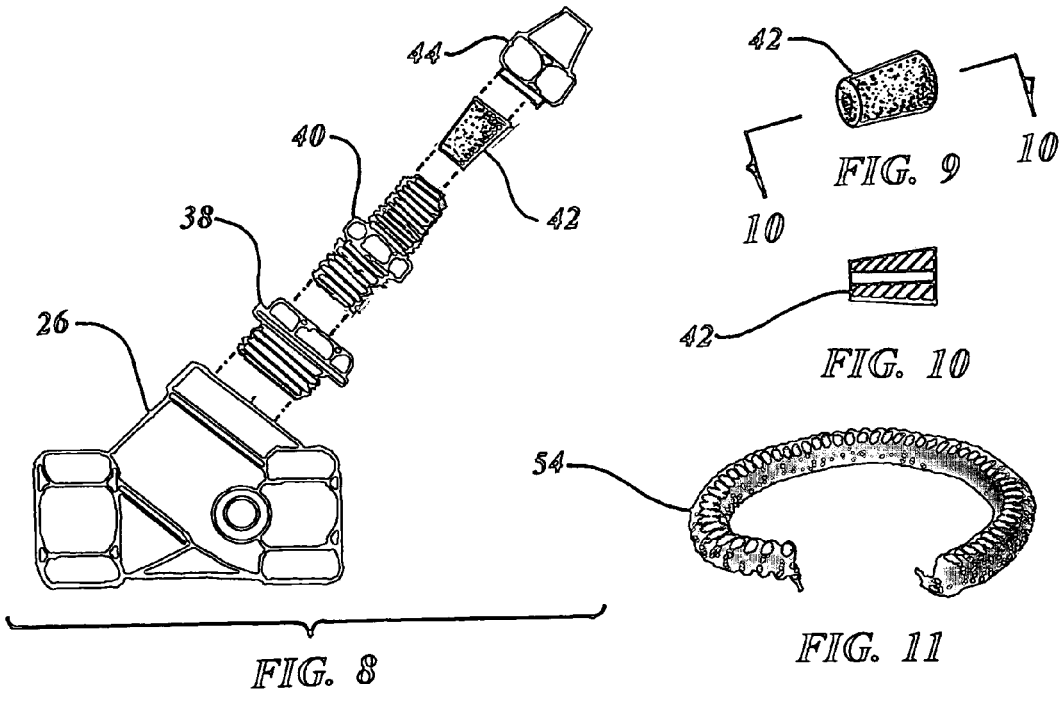
FIG. 8
FIG. 9
FIG. 10
FIG. 11

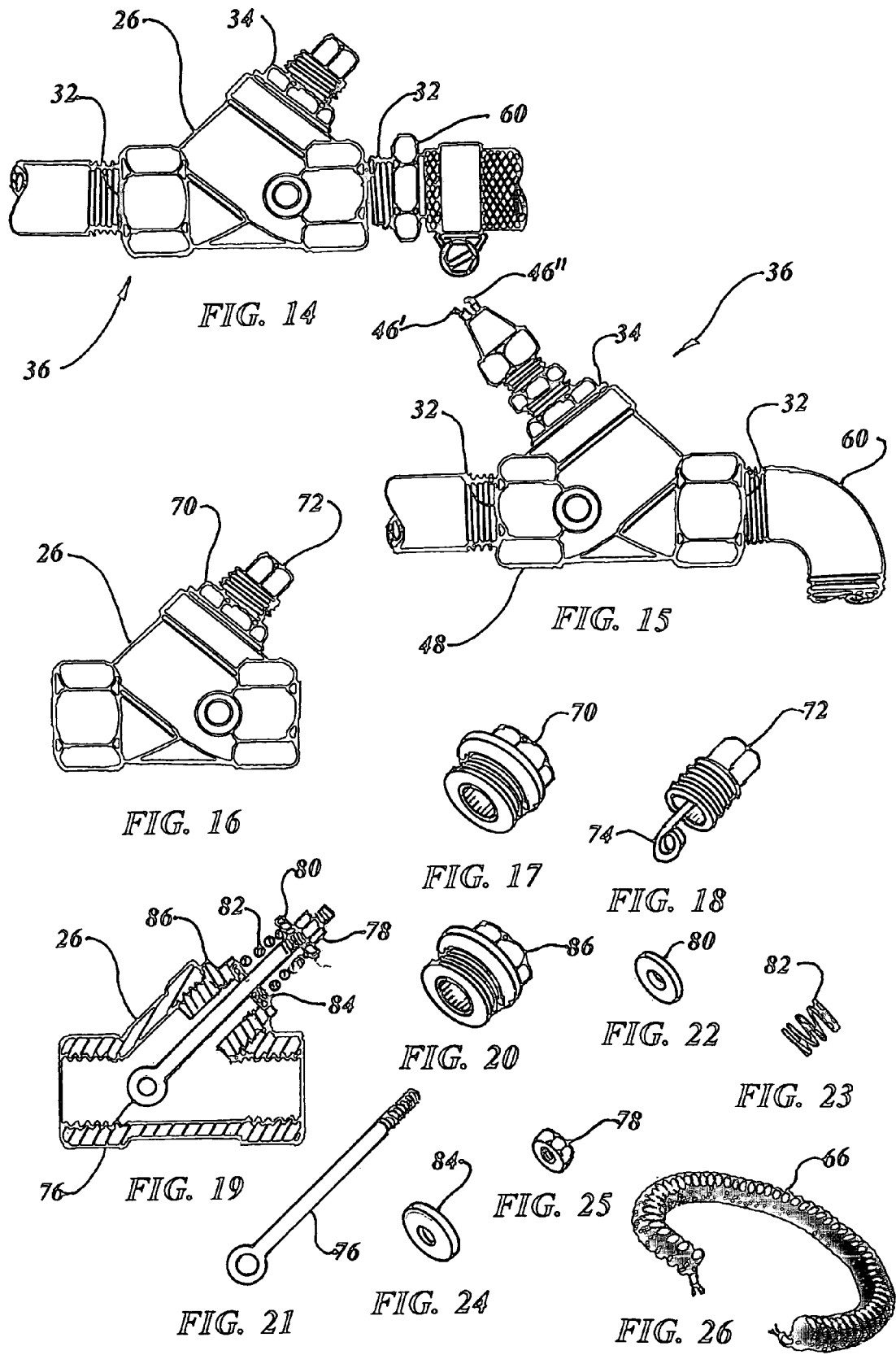

IN-PIPE HEAT TRACE SYSTEM

TECHNICAL FIELD

The present invention relates to heating liquid within pipes in general. More specifically to a system that incorporates a coiled coated wire disposed within a water pipe to prevent freezing while servicing aircraft at a loading gate.

BACKGROUND ART

Previously, many types of heating systems have been used in endeavoring to provide an effective means to heat liquids within a pipe or chamber.

A search of the prior art did not disclose any patents that possess the novelty of the instant invention; however the following U.S. patents are considered related:

| U.S. Pat. No. | Inventor | Issue Date |
| --- | --- | --- |
| 3,378,673 | Hopper | Apr. 16, 1968 |
| 3,716,693 | Bleckmann | Feb. 13, 1973 |
| 5,408,579 | Hunt | Apr. 18, 1995 |
| 5,497,824 | Rouf | Mar. 12, 1996 |
| 5,774,627 | Jackson | Jun. 30, 1998 |
| 6,078,730 | Huddart et al. | Jun. 20, 2000 |
| 6,539,171 B2 | VonArx et al. | Mar. 25, 2003 |

Bleckmann in U.S. Pat. No. 3,716,693 discloses an electrical tubular heating element consisting of a metal outer tube with heating resistance arranged in the outer tube. The zone adjacent to the inner wall of the tube is filled with an insulating material with a high melting point. Adjacent to the heating resistance is a layer of glass such that when the outer tube temperature reaches a predetermined value the leakage current switches off the heating element.

U.S. Pat. No. 5,408,579 issued to Hunt is for an electric heating assembly having a resistance heating wire disposed within a metal sheath. A sleeve or liner extends into the sheath sufficiently to surround a heated portion of the wire adjacent to the inner end of its respective pin.

Rouf in U.S. Pat. No. 5,497,824 teaches discloses heat transfer method having fluid passing through a turbulator and a helical coil inside or outside of a tube. The turbulator includes a twisted strip surrounded by a helical coil that is closely spaced from the walls of the tube. Heat transfer to a second fluid is accomplished through the use of a helical coil installed on the outside of the tube.

U.S. Pat. No. 5,774,627 issued to Jackson discloses a heating element for a water heater with a resistance wire coiled within a heat conducting material such as magnesium oxide powder. The number of coil returns per unit lengthen of element in bend areas may be reduced by stretching the coiled heating wire to attain the desired length of resistance wire per unit length of the element. Reduced power at the bend lowers element temperature reducing water scaling and extending the life of the element.

Huddart et al. in U.S. Pat. No. 6,078,730 discloses a heated corrugated conduit with a heater wire within the conduit. The heater wire is a spirally wound helix having a varying pitch providing different levels of heat within the conduit.

U.S. Pat. No. 6,539,171 B2 of VonArx et al. teaches heating elements that are spirally shaped in a plurality of forms which are thermally conductive and electrically insulated with a polymeric coating such as a fluorocarbon resinous material.

For background purposes and as indicative of the art to which the invention is related reference may be made to the remaining cited patent issued to Hooper in U.S. Pat. No. 3,378,673.

DISCLOSURE OF THE INVENTION

The invention is for heating a fluid piping system to prevent freezing. The prior art for this type of system typically uses standard voltage cable tapes or heating blankets that are wound around the outside of a hose, pipe or tube. These tapes and blankets are well known in the art and have been used for decades basically for the purpose of preventing freezing of water and bursting the pipes.

While this type of heating system functions fairly well in general practice some difficulties occur when used for water serviced by the airports to provide service and potable water to the aircraft adjacent to a passenger loading bridge. Additional bulk is created along with some heat loss when the heat source is on the outside. Wrapping around fittings and connectors often causes voids which by their very nature prevent full coverage as well as problems of an overall unsightly appearance. Further when a flexible hose is required the problem is increased as the hose flexibility may be seriously impaired.

There have been some piping systems in the past that were developed specifically for airports that simply used insulated wires within the pipes and hoses however the expansion, contraction and damage created by collapsing, coiling and spooling frequency of a hose created reliability problems.

It is therefore the primary object of the invention to overcome this specific long felt need by using a coiled wire heating element inside the pipe or hose which eliminates the reliability problem almost entirely. The coiled wire is basically the same as used conventionally on telephones often referred to as retractable coiled cord. The connection through the piping is accomplished using watertight connectors on the entrance and exit points in the piping which have been proven to be watertight and reliable since these connectors have been in use for years in their basic form and are well known in the industry. This type of coiled wire eliminates broken or damaged heating elements as it flexes inside a hose and is not affected by expansion and contraction of the water inside of the piping system.

Another object of the invention is its adaptability as it may be used with flexible hose, metallic pipe or thermoplastic tubing as the conduit for the service and potable water; further the system may be to heat fluids and liquids in a variety of different systems other than water. This capability is extended to all types and varieties of fluids particularly where combinations of rigid and flexible piping are encountered.

Still another object of the invention provides even heating throughout the run as the heating wire is coiled evenly, unlike straight wire runs that must be looped or kinked on the ends to allow for expansion and contraction. Further where fittings such as elbows or U-bends are used the coiled wire is ideal as it flexes only the required amount to follow the internal contour of the fitting with affecting the watt density of the wire to only a very limited extent.

Yet another object of the invention is found in the ability of the coiled wire to be used in the conduit in all of the forms approved for use with drinking water by the National Sanitation Foundation (NSF).

A further object of the invention utilizes low voltage which has many advantages over line voltage as it is safer relative to human intervention and since the voltage is under 30 volts AC the governing safety code regulations are much less restrictive making the system easier to be approved by various airport authorities.

These and other objects and advantages of the present invention will become apparent from the subsequent detailed description of the preferred embodiment and the appended claims taken in conjunction with the accompanying drawings.

BRIEF DESCRIPTION OF THE DRAWINGS

FIG. 1 is a partial isometric view of the heat trace system mounted beneath an extended typical passenger loading bridge in the preferred embodiment. It will be noted that the heat trace system is illustrated larger in diameter than in actual practice in order to easily visualize the structure relative to the loading bridge.

FIG. 2 is a partial isometric view of the heat trace system mounted beneath a retracted typical passenger loading bridge in the preferred embodiment.

FIG. 3 is a partial isometric view of the heat trace system mounted beneath the front portion of a typical passenger loading bridge in the second embodiment.

FIG. 6 is a side elevation view of the upstream fitting in the preferred embodiment including a portion of a steel pipe at its entrance side and a portion of thermoplastic tubing at its exit side.

FIG. 7 is a side elevation view of the downstream fitting in the preferred embodiment including a portion of a steel pipe at its entrance side and a 90 degree elbow attached to its exit side.

FIG. 8 is an exploded view of the watertight connector in the upstream fitting of the preferred embodiment.

FIG. 9 is a partial isometric view of the resilient plug of the watertight fitting in the preferred embodiment.

FIG. 10 is a cross sectional view taken along lines 10-10 of FIG. 9.

FIG. 11 is a partial isometric view of the single conductor coated retracted coiled wire in the preferred embodiment.

FIG. 14 is a side elevation view of the upstream fitting in the second embodiment including a portion of a steel pipe at its entrance side and a portion of thermoplastic tubing at its exit side.

FIG. 15 is a side elevation view of the downstream fitting in the second embodiment including a portion of a steel pipe at its entrance side and a 90 degree elbow attached to its exit side.

FIG. 16 is a side elevation view of the upstream fitting in the second embodiment including an adapter and plug.

FIG. 17 is a partial isometric view of the plug adapter in the second embodiment.

FIG. 18 is a partial isometric view of the plug with the integral curled keeper in the second embodiment.

FIG. 19 is an cross sectional view taken on an arbitrary center line of the upstream fitting in a variation of the second embodiment using an eye bolt to hold the end of the coiled cord in place.

FIG. 20 is a partial isometric view of the adapter in the variation of the second embodiment.

FIG. 21 is a partial isometric view of the eye bolt in the variation of the second embodiment.

FIG. 22 is a partial isometric view of the seat in the variation of the second embodiment.

FIG. 23 is a partial isometric view of the compression spring in the variation of the second embodiment.

FIG. 24 is a partial isometric view of the washer in the variation of the second embodiment.

FIG. 25 is a partial isometric view of the nut in the variation of the second embodiment.

FIG. 26 is a partial isometric view of the two conductor coated retracted coiled wire in the second embodiment.

BEST MODE FOR CARRYING OUT THE INVENTION

Figure 4:
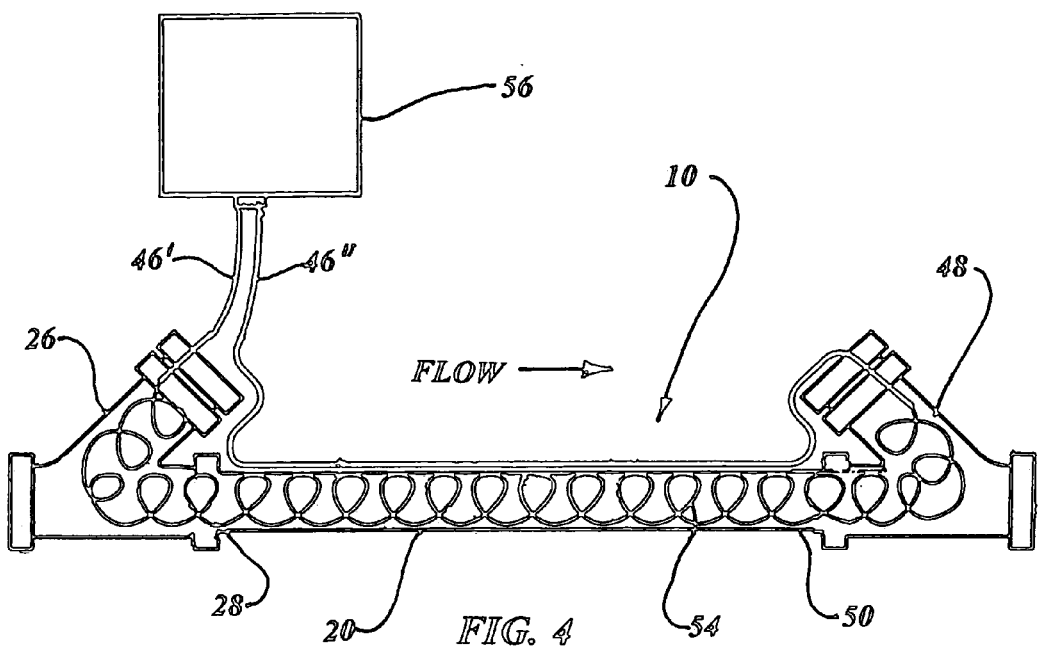
FIG. 4 is a basic schematic diagram of the heat trace system in the preferred embodiment.

The best mode for carrying out the invention is presented in terms of a preferred and a second embodiment. The difference between embodiments is in the type and configuration of the coiled wire with the preferred embodiment using a single conductor and the second embodiment a two conductor type. Obviously the fittings must differ slightly to accommodate the different number of conductors.

The preferred embodiment of the in-pipe heat trace system 10 for heating water servicing conduits for the prevention of freezing is shown in FIGS. 1, 2 and 4-11 and is comprised of A passageway of any type, a round passageway or a single conduit 20 capable of conducting city water to an aircraft positioned at a passenger loading bridge 52 is employed in the system 10. The preferred embodiment of the conduit 20 is illustrated in FIGS. 1, 2 and 5-7. The passageway in an acceptable configuration however, may be any type of system capable of conducting fluid in varied applications with the preferred conduit 20 a flexible hose 22 utilized in conjunction with a pipe or pipes 24 of stainless steel, iron or the equivalent thermoplastic tubing which also includes all conduits well known in the industry for conveying water.

An upstream fitting 26 is attached onto a first end 28 of the conduit 20, preferably adjacent to a building structure 30. The upstream fitting 26 consists of a 45 degree lateral Y branch fitting with connections for the conduit providing in line thru-flow connections 32 and an angled Y branch connection 34 on one side. The 45 degree angle of the branch connection 34 is in line with the flow for wire containment, as shown in FIGS. 6 and 8-10. The material of the upstream fitting 26 may be stainless steel, iron, brass, bronze or thermoplastic etc. and in order to attach to the water system of the building 30. Internal pipe threads are preferably utilized on the thru-flow connections 32 and the angled Y branch connection 34, which are in common use for this purpose.

A watertight connector 36 is disposed within the angled Y branch connection 34 of the upstream fitting with the watertight connector 36 configured to retain a wire in a watertight manner. The preferred watertight connector 36 is shown in FIGS. 8-10 and consists of a male to female adapter 38, a male compression adapter 40, a resilient stopper 42 having a hole therethrough and a compression cap 44 assembled by threading together in that order. The waterproof interface is achieved when the cap 44 is tightened against the stopper 42 squeezing the resilient material of the stopper 42 against a cold lead wire 46 protruding therethrough.

A downstream fitting 48 is attached onto a second end 50 of the conduit 20 adjacent to a cab of a passenger loading bridge 52, as illustrated in FIGS. 1, 2, 4 and 5. The downstream fitting 48 is identical to the upstream fitting 26 except the 45 degree lateral Y branch is positioned against the flow for wire containment. The same watertight connector 36 is disposed within the angled Y branch connection of the downstream fitting 48 configured to retain a cold lead wire 46 in a watertight manner.

A single conductor coated retractable coiled wire 54, shown in FIGS. 4 and 11, is disposed within the conduit 20 with a separate cold lead wire 46 attached at each end, as depicted in FIG. 4, entering through the upstream fitting 26 and leaving through the downstream fitting 48. The retractable single conductor coiled wire 54 incorporates Teflon insulation covering the single conductor with a nylon jacket covering the insulation. The retractable single conductor coiled wire has a conductor size from 16 American Wire Gauge (16 AWG) to 6 American Wire Gauge (6 AWG) with the conductor consisting of solid copper, solid aluminum, stranded copper or stranded aluminum.

A low voltage solid state power control box 56 is in communication with the single conductor coiled wire 54 providing regulated electrical energy for heating the coiled wire to prevent water from freezing within the conduit 20 prior to and during aircraft servicing at the passenger loading bridge 52. The solid state power control box 56 provides a voltage no more than 30 volts to the single conductor coiled wire 54 from a primary mains supply. The solid state power control box 56 provides a resistance output adjustable from 0 to 24 watts per linear foot to the single conductor coiled wire 54.

This solid state power control box 56 preferably includes a low voltage power transformer with a single primary corresponding to a mains power supply with a multi-tap secondary corresponding to a specific operating length of the coiled wire, or a multi-tap primary corresponding with a mains power supply and a multi-tap secondary corresponding to a specific operating length of the coiled wire. Further the control box 56 incorporates solid state controls for regulating output power including self diagnostics in the form of a over heat protector, a heater undercurrent and over current protection device, a heater shorting and arcing protector which shut down the system until corrected, and a plurality of light emitting diode indicating lights which remain lit until a fault has been corrected. Alternatively simplified controls may be used with equal ease eliminating some protection and indication while still performing the necessary functions.

Figure 5:
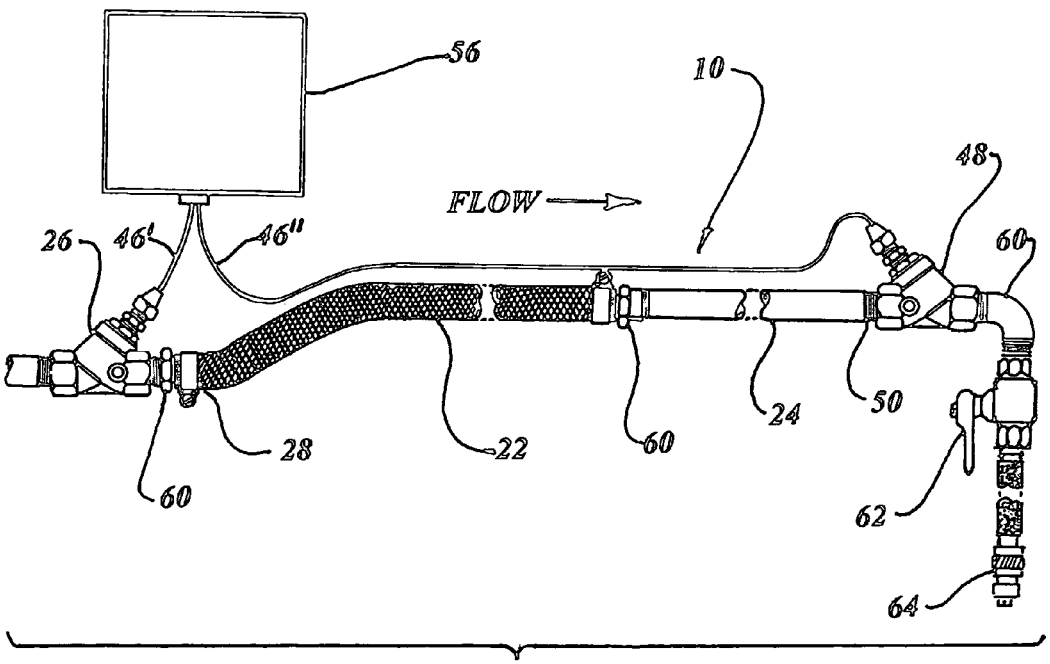
FIG. 5 is a pictorial schematic diagram of the heat trace system in the preferred embodiment including the shut-off valve and quick disconnect fitting for servicing an aircraft.

FIG. 4 illustrates the system 10 in a simplified schematic manner and FIG. 5 depicts the system 10 pictorially. The control box 56 is shown as a square outline with its location unspecified however it is preferred that the box 56 is located on the rotunda 58 of the passenger loading bridge 52, as indicated in FIGS. 1 and 2. A first cold lead wire 46' leaves the control box 56 from the bottom and enters the upstream fitting 26 where it is attached to the coiled wire 54 inside. Current flows through the single conductor coiled wire 54 within the conduit 20 heating the surrounding water by its electrical resistance where a second cold lead wire 46" leaves through the downstream fitting 48 and returns following on the outside of the conduit 20 to enter the control box from the bottom. The second cold lead wire 46" may be attached to the conduit 20 or the bridge 52 in rigid areas and to the conduit 20 in its flexible portion.

The conduit 20 preferably is attached directly to the city water at the building 30 to the upstream fitting 26 where suitable interface fittings 60 permit the hose 22 to be attached. At a last section of the bridge 52, the hose 22 is attached to the rigid pipe 24 on one end and to the downstream fitting 48 on the other. An interface fitting 60 in the form of an elbow is attached to the downstream fitting 48 and a valve 62 and a separate hose 22 terminating with a quick disconnect coupling 64 for attachment to an aircraft. FIG. 2 illustrates the bridge 52 in its fully retracted position with the hose 22 hanging in a loop to permit bridge movement for accommodating various aircraft.

Figure 12:
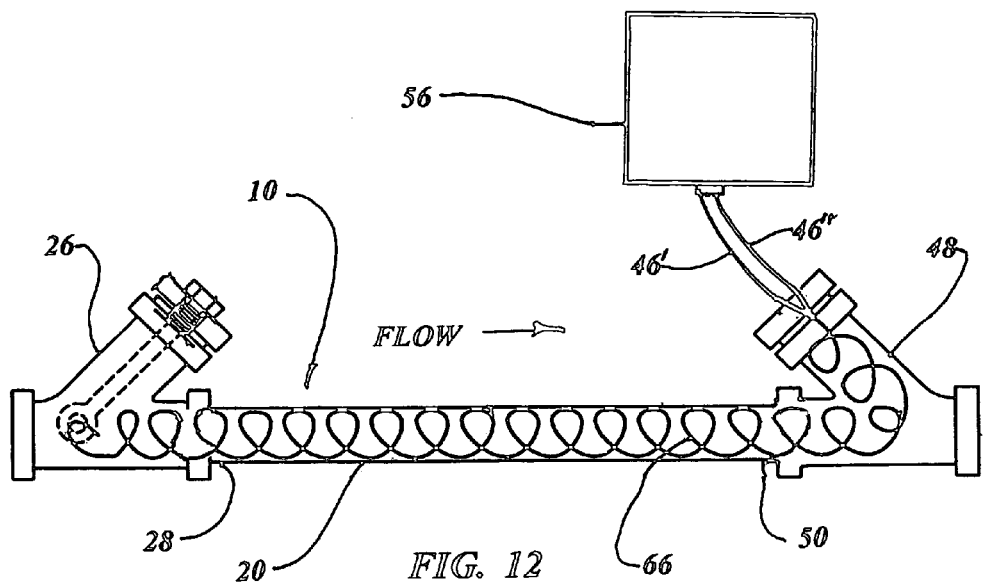
FIG. 12 is a basic schematic diagram of the heat trace system in the second embodiment.
Figure 13:
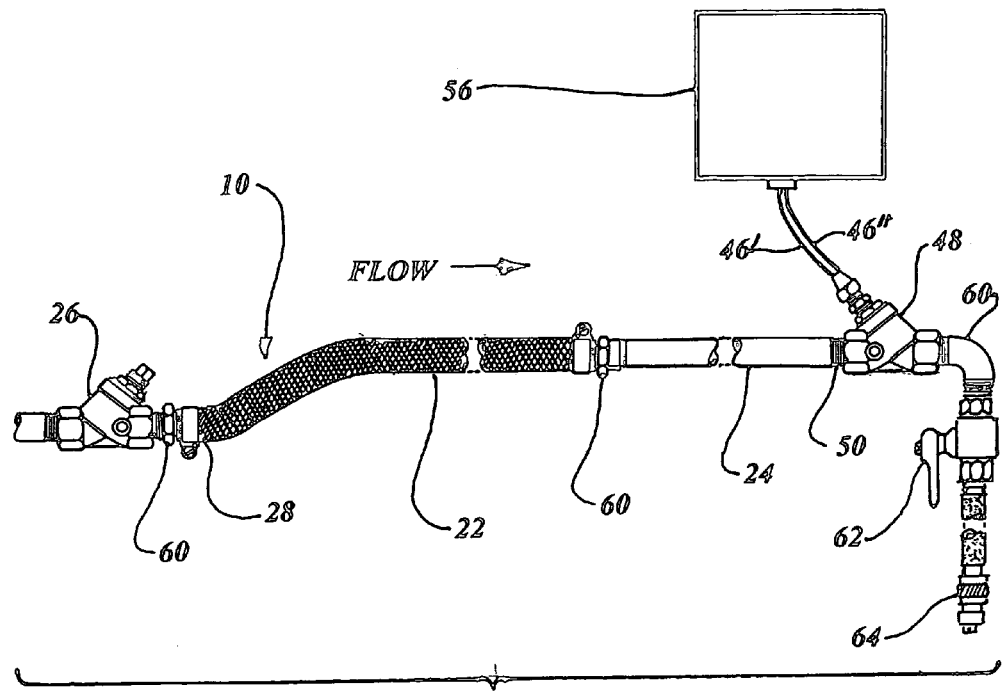
FIG. 13 is a pictorial schematic diagram of the heat trace system in the second embodiment including the shut-off valve and quick disconnect fitting for servicing an aircraft.

The second embodiment of the invention is illustrated in FIGS. 3 and 12-26 and incorporates all of the same elements with the exception the coiled single conductor wire 54 is replaced with a two conductor coiled wire 66 which has all of the same characteristics except the number of conductors, as illustrated in FIGS. 12 and 26. This change in having two conductors instead of one requires the cold lead wires 46' and 46" to enter and leave the conduit 20 at a single location, while this location is arbitrary it is preferred that the lead wires 46' and 46" exit the downstream fitting 48 and enter the control box 56 which is now located on the cab 68 of the passenger loading bridge 52, as shown pictorially in FIGS. 3, 12 and 13. It should be noted that any combination of locations may be used with equal ease and dispatch and has already been anticipated by the inventor.

The watertight connector 36 disposed within the angled Y branch connection of the upstream fitting 26 is therefore configured to retain two wires in a watertight manner where they intersect and are joined together. The preferential method utilizes a plug adapter 70 and a plug 72 having an integral curled keeper 74 configured to grasp and retain the two conductor cable 66 joined at its distal end, as illustrated in FIGS. 16-18. A variation of the watertight connector 36 configured to retain two wires consists of an eye bolt 76 a nut 78, a washer 80, a compression spring 82, a seal 84 and a eyebolt adapter 86 as depicted in FIGS. 19-25. Either embodiment retains two wires in a watertight manner as described above and functions equally well.

In operation the system is completely automatic with power supplied to the heater coiled wire 54 or 66 within pre-selected temperature limits at which electrical current is provided to the wire which is varied to maintain the water at an above freezing temperature.

While the invention has been described in complete detail and pictorially shown in the accompanying drawings, it is not to be limited to such details, since many changes and modifications may be made to the invention without departing from the spirit and scope thereof. Hence, it is described to cover any and all modifications and forms which may come within the language and scope of the appended claims.

The invention claimed is:

1. A heat trace system for heating water servicing conduits for the prevention of freezing which comprises:
   a) a retractable conduit capable of conducting city water to an aircraft positioned at a passenger loading bridge, said conduit extendable with said bridge,
   b) an upstream fitting attached onto a first end of said conduit adjacent to a building structure,
   c) a downstream fitting attached onto a second end of said conduit adjacent to a passenger loading bridge cab,
   d) a coated retractable coiled wire disposed within said conduit with a cold lead wire entering through said upstream fitting and leaving through said downstream fitting, said wire retractable within the conduit during use, and
   e) a low voltage solid state power control box in communication with said coiled wire providing regulated electrical energy for heating said coiled wire to prevent water from freezing within the conduit prior to and during aircraft servicing at the passenger loading bridge, wherein said solid state power control box providing a voltage no more than 30 volts to said coiled wire from a primary mains supply having a resistance output adjustable from 0 to 24 watts per linear foot.

2. The heat trace system as recited in claim 1 wherein said conduit is selected from the group consisting of flexible hose, copper pipe, stainless steel pipe and thermoplastic tubing.

3. The heat trace system as recited in claim 1 wherein said upstream fitting further comprises a 45 degree lateral Y branch fitting having in line thru-flow connections for the conduit and an angled Y branch connection in line with the flow for wire containment.

4. The heat trace system as recited in claim 3 further comprising a watertight connector disposed within the angled Y branch connection of the upstream fitting with said watertight connector configured to retain a single wire in a watertight manner.

5. The heat trace system as recited in claim 3 further comprising a watertight connector disposed within the angled Y branch connection of the upstream fitting with said watertight connector configured to retain two wires in a watertight manner.

6. The heat trace system as recited in claim 5 wherein said watertight connector configured to retain the two wires further comprises an eye bolt, a nut, a compression spring and a washer.

7. The heat trace system as recited in claim 5 wherein said watertight connector configured to retain the two wires further comprises a plug having an integral curled keeper configured to grasp and retain a two conductor coiled wire joined at the distal end.

8. The heat trace system as recited in claim 1 wherein said downstream fitting further comprises a 45 degree lateral Y branch fitting having in line thru-flow connections for the conduit and an angled Y branch connection positioned against the flow for wire containment.

9. The heat trace system as recited in claim 8 further comprising a watertight connector disposed within the angled Y branch connection of the downstream fitting with said watertight connector configured to retain at least one wire in a watertight manner.

10. The heat trace system as recited in claim 8 further comprising a watertight connector disposed within the angled Y branch connection of the upstream fitting with said watertight connector configured to retain two wires in a watertight manner.

11. The heat trace system as recited in claim 1 wherein said retractable coiled wire further comprises two conductors.

12. The heat trace system as recited in claim 1 wherein said retractable coiled wire further having a conductor size from 16 American Wire Gauge (16 AWG) to 6 American Wire Gauge (6 AWG) with the conductor selected from the group consisting of solid copper, solid aluminum, stranded copper and stranded aluminum.

13. The heat trace system as recited in claim 1 wherein said solid state power control box further comprises a plurality of solid state controls for regulating output power including self diagnostics in the form of a over heat protector, a heater undercurrent and over current protection device, a heater shorting and arcing protector, which shut down the system until corrected, with a plurality of light emitting diode indicating lights which remain lit until a fault has been corrected.

14. A heat trace system for heating water servicing conduits for the prevention of freezing which comprises:
   a) a retractable conduit capable of conducting city water to an aircraft positioned at a passenger loading bridge, said conduit extendable with said bridge,
   b) an upstream fitting attached onto a first end of said conduit adjacent to a building structure,
   c) a downstream fitting attached onto a second end of said conduit adjacent to a passenger loading bridge cab,
   d) a coated retractable coiled wire disposed within said conduit with a cold lead wire entering through said upstream fitting and leaving through said downstream fitting, said wire retractable within the conduit during use, wherein said retractable coiled wire further comprises a single conductor, and
   e) a low voltage solid state power control box in communication with said coiled wire providing regulated electrical energy for heating said coiled wire to prevent water from freezing within the conduit prior to and during aircraft servicing at the passenger loading bridge.

15. A heat trace system for heating water servicing conduits for the prevention of freezing which comprises:
   a) a retractable conduit capable of conducting city water to an aircraft positioned at a passenger loading bridge, said conduit extendable with said bridge,
   b) an upstream fitting attached onto a first end of said conduit adjacent to a building structure,
   c) a downstream fitting attached onto a second end of said conduit adjacent to a passenger loading bridge cab,
   d) a coated retractable coiled wire disposed within said conduit with a cold lead wire entering through said upstream fitting and leaving through said downstream fitting, said wire retractable within the conduit during use, wherein said retractable coiled wire further comprises teflon insulation with a nylon jacket, and
   e) a low voltage solid state power control box in communication with said coiled wire providing regulated electrical energy for heating said coiled wire to prevent water from freezing within the conduit prior to and during aircraft servicing at the passenger loading bridge.

* * * * *